United States Patent [19]

Tansey

[11] Patent Number: 5,050,993
[45] Date of Patent: Sep. 24, 1991

[54] DIFFRACTION ENCODED POSITION MEASURING APPARATUS

[75] Inventor: Richard J. Tansey, Thousand Oaks, Calif.

[73] Assignee: Rockwell International Corporation, El Segundo, Calif.

[21] Appl. No.: 365,990

[22] Filed: Jun. 14, 1989

[51] Int. Cl.$^5$ .............................................. G01B 9/02
[52] U.S. Cl. .................................. 356/356; 356/349; 250/237 G
[58] Field of Search ....................... 356/349, 356, 358; 250/237 G, 231.16

[56] References Cited

U.S. PATENT DOCUMENTS

| 3,738,753 | 6/1973 | Huntley | 250/237 G |
| 4,170,026 | 12/1987 | Magome et al. | 356/349 |
| 4,676,645 | 6/1987 | Taniguchi et al. | 250/237 G |

Primary Examiner—Samuel Turner
Attorney, Agent, or Firm—Bruce C. Lutz; V. Lawrence Sewell; H. Fredrick Hamann

[57] ABSTRACT

When a lightwave passes through a transmission grating, diffracted beams appear at the output or opposite side of the grating that are effectively Doppler shifted in frequency (phase) whereby a detector system can compare the phase of the zero order and higher order beams to obtain an indication of position. Multiple passes through the grating increase resolution for a given wavelength of a laser signal. The resolution can be improved further by using a smaller wavelength laser to generate the grating itself. Since the grating must only have a pitch sufficient to produce diffracted orders, inexpensive, ultraviolet wavelength lasers can be utilized and still obtain high resolution detection.

7 Claims, 2 Drawing Sheets

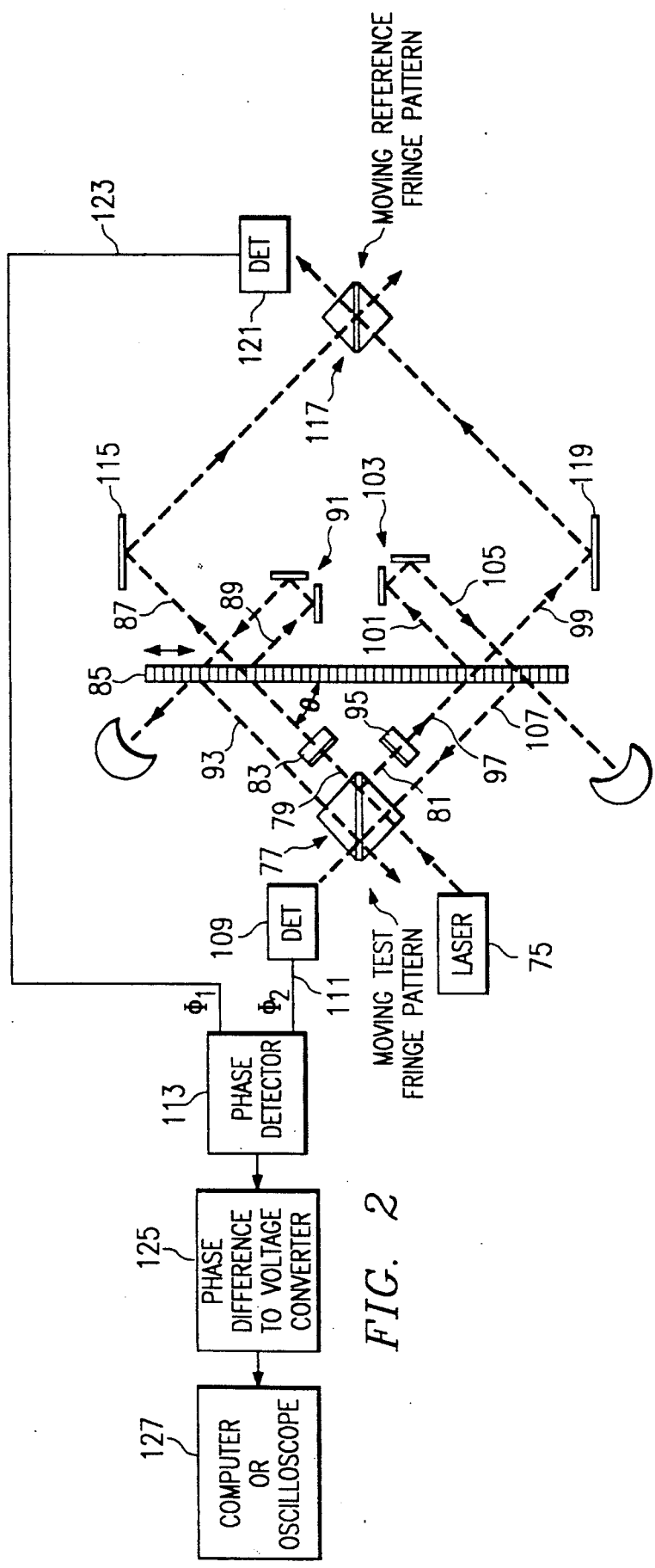

5,050,993

DIFFRACTION ENCODED POSITION MEASURING APPARATUS

STATEMENT OF GOVERNMENT INTEREST

The Government has rights in this invention pursuant to Contract DE-AC03-86SF16499 awarded by the U.S. Department of Energy.

The present invention is generally concerned with position detection and more specifically, with position detection using light-beams such as produced by lasers in conjunction with a grating whose movement or position is being detected. Even more specifically, the invention is related to the effective change in phase of a laser signal after passing through a grating and producing diffracted orders higher than zero, and using detection apparatus to measure the difference between the zero order beam and one of the higher order beams for use in accurately measuring displacement of the grating.

BACKGROUND

Prior art position detector apparatus have used gratings as an encoder for linear or angular measurements and comprises a common technique used in many commercial devices. One such prior art device is illustrated in a paper authored by myself and S. Holly in the proceedings of SPIE—The International Society For Optical Engineering, Volume 887, as presented Jan. 14, 1988, in Los Angeles, Calif., in the Acquisition, Tracking and Pointing group. The title of the article was, "Development of An Interferometric Encoder For High Resolution Angular Measurements". The prior art technology of this paper as concerns heterodyne detection and other well-known prior art techniques is incorporated by reference.

The grating for many prior art devices is produced holographically by two beams which interfere at an angle of incidence theta ($\theta$), on a substrate which retains the image of the laser pattern. The spacing of the grating will be an amount G which equals lambda ($\lambda$) divided by (2 times sine of the angle theta) where lambda is the wavelength of the beam. Prior art techniques have compared the position of a reference grating with one being produced at the time of measurement by the laser involved. Data from the two gratings are then compared in a phase measurement type test to provide an indication of position. A device such as a computer can keep track of the phase changes for total number of cycles changed to get absolute position relative to a reference.

While the use of gratings for an encoder for linear or angular measurements has become a common technique used in many commercial devices, all prior devices known to applicant have involved the use of a grating whose spacing is considerably larger than the wavelength of the lightwave comprising the laser beam signal. The prior art approach has used increasingly accurate and accordingly expensive phase detectors to get the position detection accuracies required for some applications. The approach discussed here would use a small wavelength laser to achieve a small grating space thereby relaxing the requirement on phase detection.

Since the present invention involves the discovery that the grating can have a spacing comparable to or less than the wavelength, one aspect of the present invention allows the gratings to be produced by a short wavelength, (more expensive) laser from the fringe effects produced by the interference of two such lasers and then this grating be used with a longer wavelength but less expensive laser in combination with a low cost phase detector to produce the measurement desired.

A further realization in the present invention is that if a diffracted beam is redirected through the grating N times before being detected, the change in phase will be N times the change in phase of a single pass system.

A multipass system using only the multipass concept portion of the present invention is illustrated by an article in Motion magazine, July/August, 1986, authored by Nishimura and Ishizuka.

It is also recognized in the present invention that while there is less power in a diffracted beam of greater than first order, the higher order diffracted beams have greater phase changes than do the lesser order beams and thus, this factor can be used to increase the phase change in the output signal relative the movement of the grating.

All of the above features presented in this concept when combined lessen the requirement for both the cost of the laser (i.e., a low cost laser may be used) and the cost of the phase detector since the phase detector can be of a much lower accuracy than was required in the prior art.

It is thus an object of the present invention to provide an improved motion detector or diffraction decoder apparatus involving high accuracy motion detection without the necessity of high cost components.

Other objects and advantages of the present invention will be apparent from a reading of the specification and appended claims in conjunction with the drawings wherein;

FIG. 2 is a four pass beam reflected encoder system using the principles of FIG. 1.

DETAILED DESCRIPTION

Figure 1:
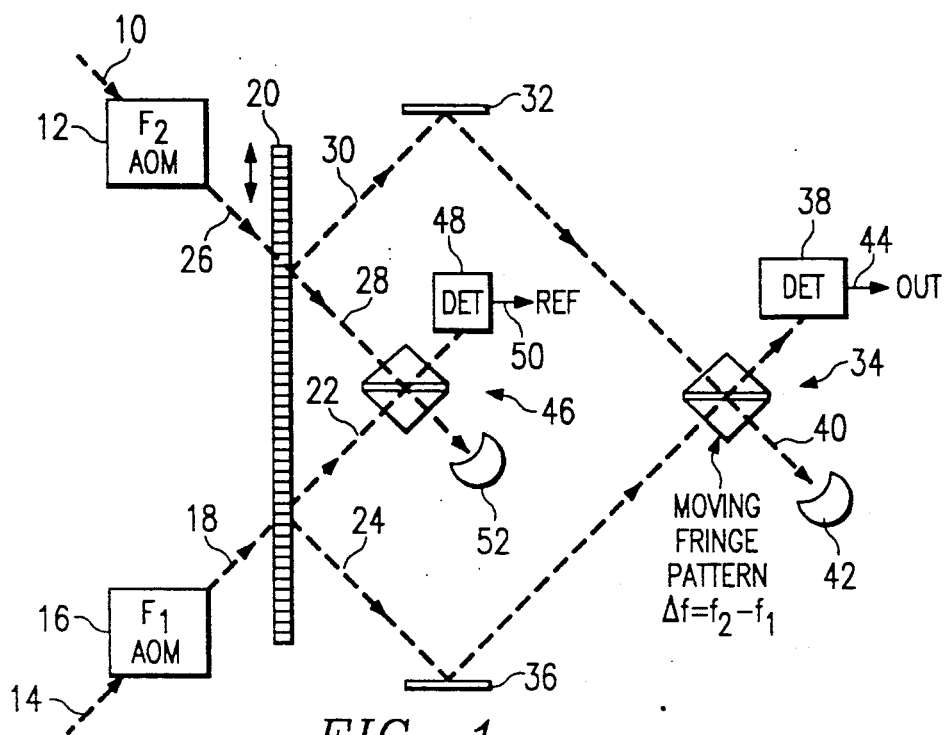
FIG. 1 is a representation of a two pass encoder used to easily describe the inventive concept.

In FIG. 1 a laser source supplies a light beam signal on a path or beam labeled 10. This beam is passed through a block 12 labeled AOM for acouso-optic modulator which superimposes a modulated signal on the laser beam at a frequency that can be easily detected. In one embodiment of the invention, the laser beam had a wavelength of 633 nanometers which is approximately equivalent to $4.7 \times 10^{12}$ megahertz. On the other hand, the modulating frequency from the AOM 12 may be a much lower value such as 40 megahertz. A second laser beam 14 is shown passing through a second AOM 16 and producing an output beam 18 modulated at 41 megahertz. The source 14 may be the same as source 10 and redirected using mirrors or may be a separate source if it is in phase with 10. The light beam 18 after passing through a grating 20 continues as a zero order beam 22 and a portion of the original beam 18 is diffracted as an N order beam such as first order beam 24. The output of AOM 12 is supplied as a zero order beam 26 to the grating 20 and after passage through the grating 20, continues as a zero order beam 28 and a diffracted beam 30. The phase of the diffracted beams 24 and 30 change phase in opposite directions for a given direction of movement of grating 20. Again, beam 30 may be any of N orders but for the purposes of explanation will be a first order beam. The beam 30 is deflected from a mirror 32 to a beam splitter 34. The beam 24 is reflected off a further mirror 36 and is also supplied to beam splitter 34. Within the beam splitter 34, the signals are combined to produce a fringe pattern which is detected with a detecting device of the square law type such as a photo detector. Detector 38 is labeled as the detector of the fringe pattern. A portion of the beam reflected from beam 32 is labeled as beam 40 and is the remaining portion of beam 30 which is still in existence after the combining or mixing process. Beam 40 would be supplied to some type of beam dump 42 and would be unused. The output of detector 38 would be an electrical signal indicative of the difference frequency between the modulated signal on beams 24 and 30. This output is labeled 44. The beams 22 and 28 are combined in a beam splitter generally designated as 46 and a fringe pattern resulting from the combination of 22 and 28 is detected by a detector 48 which operates in a manner similar to that of 38. A reference signal output is obtained from the detector 48 and is supplied on a lead 50. The extension of light beam 28 that is the unused portion, is also supplied to a beam dump 52.

In FIG. 2, a laser 75 is shown supplying a light beam to a beam splitter generally designated as 77 and the beam of light is output as two separate beams 79 and 81 from beam splitter 77. Beam 79 goes through a modulating device such as an AOM 83 and then passes through a grate 85 where it continues as a beam 87 of zero order and a first order beam 89. The beam 89 is reflected by a pair of mirrors generally designated as 91 and returned to the grate 85 where again a zero order beam continues, and is dissipated in a bean dump and a further deflected beam of the first order 93 is returned to beam splitter 77. The beam 81 is passed through a further modulator (AOM) 95 which modulates the signal at a slightly different frequency than does the modulator 83 and provides an output 97. The output 97 passes through grating 85 and produces a zero order beam 99 and a first order diffracted beam 101. Beam 101 is reflected from a pair of mirrors generally designated as 103 and is returned as a beam 105 which is again passed through grating 85. A first order component of beam 105 is designated as 107 and it is returned to beam splitter 77. The beams 93 and 107 produce a fringe effect which is detected by a detector 109. Detector 109 provides an electrical signal on a lead 111 to a phase detector 113. The beam 87 is reflected by a mirror 115 and supplied to a beam splitter generally designated as 117. The beam 99 is reflected by a mirror 119 and also supplied to beam splitter 117. The two beams received by beam splitter 117 interfere to produce a fringe effect and the fringe effect is detected by detector 121 and an output signal is produced on lead 123 and supplied to phase detector 113. The output of phase detector 113 is a voltage proportional to the phase difference between signals from 121 and 111, and this provides a total movement indication of the grating 85. This signal can be converted to a voltage by block 125 and stored in a computer or viewed on any voltage measuring device such as an oscilloscope 127. It will be noted that the beam starting out as 79 passes through the grating 85 on two separate passes each of which has the same relative angle for a given direction of movement of the grating 85. The two beams which pass through grating 85 as a result of initial beam 81 are aligned such that they have a component which is opposite the previously referenced beam. Movement of the grating 85 produces an effect similar to a Doppler effect in phase shifting the modulating frequency of the light beam passing through. This phenomena is well-known in the art and may be verified in many reference books such as on Page 864 of a book entitled, "Applied Optics—A Guide To Optical System Design/Volume 2", by Leo Levi, copyrighted in 1980 and published by John Wiley and Sons.

Figure 3:
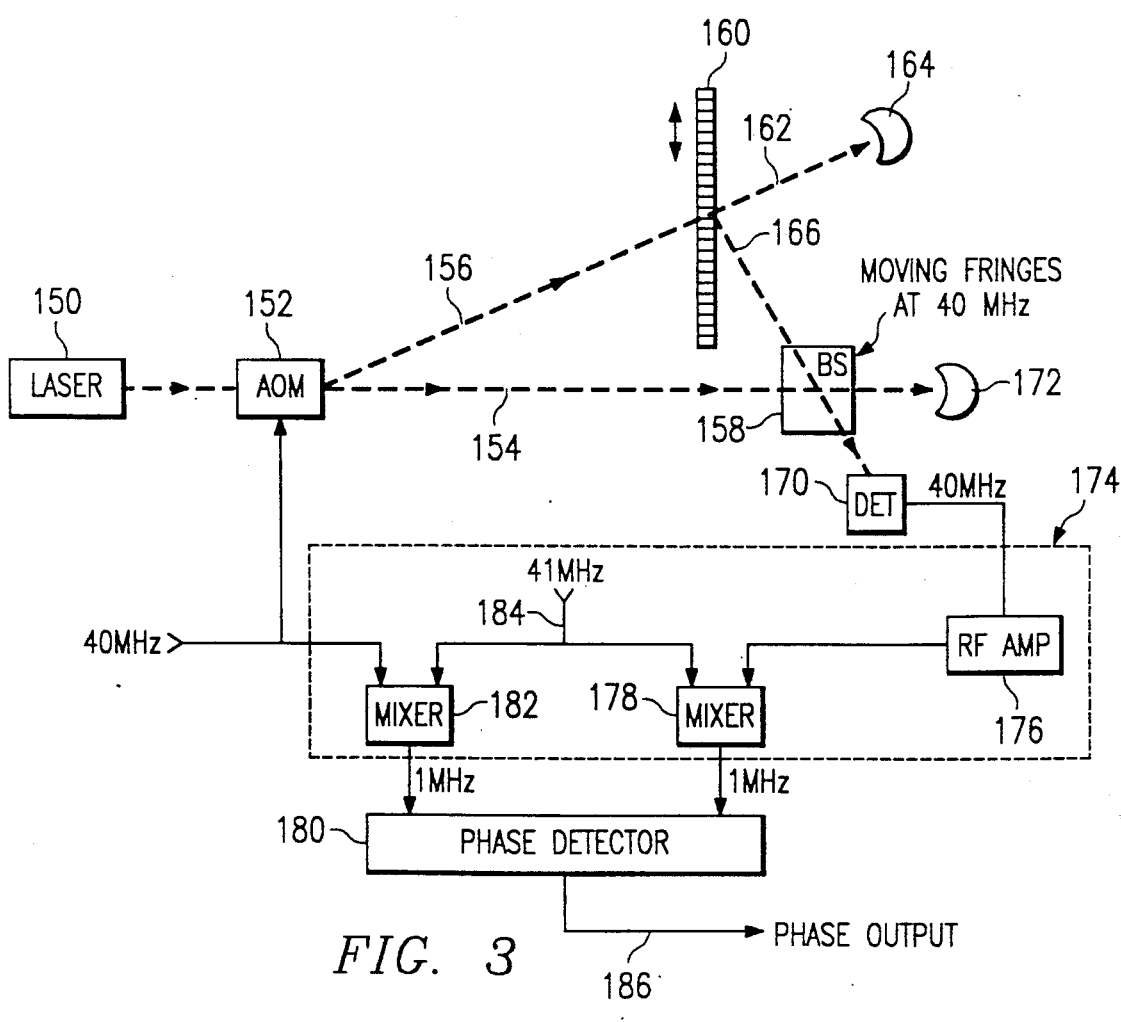
FIG. 3 is a further single pass encoder using a minimum of parts while still providing acceptable accuracy for some applications.

In FIG. 3, a laser 150 supplies a laser beam through an acousto-optic modulator 152 to provide an output zero order beam 154 and a first order beam 156. The beam 154 goes directly to a beam splitter 158 while the first order beam 156 is supplied to a grating 160 where it is output as a beam 162 which continues to a beam dump 164 and a diffracted first order beam 166 is passed to the beam splitter 158. The two beams 154 and 166 interfere or combine in the splitter 158 and produce a fringe effect output which is detected by a detector 170. The continuation of beam 154 is passed to and terminated by a beam dump 172. An electrical output of detector 170 is supplied to a dash line block generally designated as 174 which contains an RF amplifier 176. An output of the amplifier 176 is supplied to a mixer 178 whose output is supplied to a phase detector 180. A 40 megahertz signal is supplied both to the AOM 152 to provide modulation for it and to a mixer 182 within block 174. A 41 megahertz signal is supplied on a lead 184 to the two mixers 178 and 182. An output of phase detector 180 is supplied on a lead 186 which is indicative of the phase difference between the reference beam 154 which does not pass through grating 160 and the beam 156 which has a diffracted output 166 after passing through grating 160.

OPERATION

The grating 20 can be produced holographically by two beams which interfere at an angle of incidence on a substrate which retains the image of the interference pattern. The spacing is a function of the wavelength of the beams and the angle of incidence according to well-known formulas. An ultraviolet laser having a wavelength of 300 nanometers could be used to produce a spacing on a grating at 300 nanometers where the angle of incidence is 30 degrees. A cheaper laser such as a helium neon laser with a wavelength of 633 nanometers could be used to provide the laser beams 10 and 14. It may be assumed that each of the acoustic modulators 12 and 16 modulate the main laser beams at slightly different values which, for purposes of discussion, might be 40 and 41 megahertz. Thus, the beams 18 and 26 will each have a basic wavelength of 633 nanometers which is approximately equivalent to 4.7 times $10^{12}$ megahertz with a superimposed ripple of about 40 megahertz on this lightwave. As the beam 18 passes through the grating 20, a zero order beam 22 appears at the output side in line with the beam 18. A higher order beam such as a first order beam 24 is produced from diffraction. As is known in the art, for equally spaced gratings of the "Ronchi" type, there is the most intensity of the first order beam and the higher order beams have relatively less intensity and thus are more difficult to detect. However, the first order beam has the least phase shift in the diffraction and thus, if the intensity of an even higher order beam can be detected (as is the case for phase gratings or specially designed sinusoidal gratings), more phase shift is involved and thus, from the electrical phase detection standpoint, it is easier to detect a small movement of the grating 20. The beam 22, which is the zero order extension of beam 18, is combined in the beam splitter 46 with the zero order extension 28 of the beam 26. The interference or combination of the two beams 22 and 28 within the beam splitter 46 produces a fringe pattern which is detected by a square law detector such as a photodiode within detector 48. An electrical output signal is produced on lead 50 indicative of the difference between base frequency 40 and 41 megahertz signals modulated onto the original light beams by the AOM's 12 and 16. The diffracted beam 24 is reflected by mirror 36 to a beam splitter 34 where it combines with or interferes with a similar beam diffracted from beam 26 which is shown as beam 30 after being reflected from mirror 32. An interference or fringe pattern is produced by beam splitter 34 and the combination of the two incoming light beams, and this fringe pattern is detected by detector 38 and output on lead 44 as a signal which is very close to the one megahertz difference signal output by detector 48 but is phase shifted in accordance with the position of the grate 20. The difference in phase between the signals 44 and 50 can never exceed 2 pi, unless a phase counter is added which can count two pi changes, as I have used in my heterodyne systems.

Since the approach of FIG. 1 is a two pass system, the phase change at output 44 is twice as much as would be indicated by movement of grating 20. In other words, if the movement of grating 20 was 75 nanometers or ¼ the spacing, then the phase change at output 44 would be pi or 180 degrees of phase difference with respect to the signal on lead 50.

As the number of passes through the grating is increased, the phase change per amount of movement of the grating is changed by a directly proportional amount. With the approach shown in FIG. 2, wherein a four pass system is shown, the same amount of movement of grating 85 will produce twice the phase change at output 123 as was produced by the same movement of grating 20 in FIG. 1 at output 44. Likewise, the single pass system of FIG. 3 would have an output from detector 170 which would only be half the phase change of that of FIG. 1 for a like movement of grating 160 as compared to grating 20 if the two gratings had the same spacings between grid lines.

The operation of FIG. 2 is relatively straightforward once FIG. 1 is understood in that the laser beam from laser 75 is split into two separate components 79 and 81 modulated at two different frequencies such as 40 and 41 megahertz by the acoustic modulators 83 and 95. Each of these modulated light beams is then sent through the grating, reflected and returned through the grating to be combined within splitter 77. The fringe effect that is produced upon the combining is detected by detector 109 to produce a movement output signal on lead 111. The original modulated beams as appear at the output of modulators 83 and 95 have a component which is reflected by mirrors 115 and 119 wherein they are combined in splitter 117 and applied to detector 121. Detector 121 has an output which is primarily equivalent to the difference between the modulating signals applied by the two modulators 83 and 95 or, in other words, a one megahertz signal which is always within one cycle or one complete phase change of the signal appearing at the output of detector 109. The phase detector 113 detects the phase difference at any point in time between the reference detector 121 and the test detector 109. Thus, an accumulated summary of the incremental phase changes is then stored or sent to 127 indicative of the exact position of grating 85 with respect to an initial reference.

As will be realized by those skilled in the art, if the grating comprises part of a disk which is being measured for radial movement, or in other words, to measure angular motion, the only requirement is that the plane of incidence and diffraction be perpendicular to the disk upon which a grating has been produced.

The single pass version of FIG. 3 operates in a manner extremely similar to that described previously for FIGS. 1 and 2. The laser beam from laser 150 is passed through the acoustic modulator 152 and provides as an output a zero order beam represented by indicator 154 which is passed directly to the beam splitter 158 and an N order beam such as first order which is represented by 156. As shown, light beam 154 being the zero order beam is not modulated by AOM, while beam 156 carries the AOM modulation frequency of 40 megahertz. However, after beam 156 is passed through grating 160, the diffracted portion of the beam represented as 166 will be of a phase relative to the beam 154 in accordance with the position of the grating 160. The incident extension of beam 156 which is labeled 162 is merely terminated in a beam dump 164. The beam splitter 158 combines the two beams 154 and 166 and through the fringe effect and modulating difference, provides an output which is detected as moving fringes by detector 170. The output of detector 170 is indicative of the phase difference between the two beams 154 and 166 and this difference as previously indicated, is as a result of the absolute position of the grating 160. The two signals which have a base of 40 megahertz as illustrated in this drawing, are then mixed in respective mixers with a 41 megahertz signal 184. Basically, the signal source 184 is providing a constant reference for the two mixers. The output signals of the two mixers are phase detected by phase detector 180 which then provides an output on 186 to be supplied to some type of accumulator such as 125 in FIG. 2.

It may be noted that alignment of the apparatus of the present invention is trivial. If a diffracted order is produced and interferes with other diffracted orders, the system works. Alignment of prior art systems has not been as easy. Also, as has been implied previously, higher diffracted orders will produce more grating movement phase detection sensitivity. Diffracted orders of order M will produce 2 times M times pi phase changes for a grating movement equal to G for a single pass. Both higher diffracted orders and multiple passes may be used in combination to even further reduce the phase detection requirements of the phase detector or, in the alternative, to greatly increase the accuracy of motion or movement detection of a grating being monitored.

In summary, the present invention is directed to a concept which either greatly increases the accuracy of motion detection over prior art, or greatly reduces the complexity of the electronic phase detecting apparatus for a given accuracy with respect to the prior art or some intermediate combination of both. This feat is accomplished by utilizing multiple passes of a laser beam through a grating, or using higher order diffracted beams than the first order or both. A further aspect of the invention is the realization that the spacing of the grating can be equal to or less than the wavelength of the laser thereby further decreasing the detector phase resolution requirements of the electronic portion of the circuit for a given frequency laser beam generating device.

While I have shown a few embodiments of my inventive concept, I wish to be limited not by the specific embodiments illustrated but only by the scope of the appended claims wherein I claim:

1. The method of detecting movement of a grating relative a laser light source comprising the steps of:

passing a first laser beam, of a given first wavelength and modulated at a first frequency, at a first angle through a grating from a first side to an opposite second side, the grating having a pitch which produces a diffracted beam from said first wavelength and where the first laser beam has a component in a first direction parallel to said grating, the first laser beam upon exiting the grating having incident and diffracted components;

redirecting the diffracted component of the first laser beam of said first wavelength to produce a second laser beam aimed at an angle relative to the grating which is the same as said first angle to pass through the grating from said second side to said first side, the second laser beam upon exiting the grating having incident and diffracted components;

passing a third laser beam of a second frequency, which second frequency is slightly offset from said first frequency by an AOM, at a second angle through the grating from the first side to the second side, the grating having a pitch which is sufficient to produce diffracted orders from the wavelength of said second frequency and where the third laser beam has a component in a second direction opposite said first direction and parallel to said grating, the third laser beam upon exiting the grating having incident and diffracted components;

redirecting the diffracted component of the third laser beam of said second frequency to produce a fourth laser beam aimed at an angle relative the grating which is the same as said second angle to pass through the grating from said second side to said first side, the fourth laser beam upon exiting the grating having incident and diffracted components, the angles and frequencies and components previously recited being picked such that a plane defining the incident and diffracted beams is perpendicular to the grating and such that the diffracted component of the fourth laser beam will intersect with the diffracted component of the second laser beam to produce a fringe pattern in a beam splitter which moves at the difference frequency introduced by the AOM's;

generating a reference signal from the incident components of said first laser and third laser beams after passage through the grating;

generating a phase shifted first output signal from the moving fringe pattern; and detecting the difference in phase between the reference and first output signals to provide a second output signal indicative of the relative position of the grating relative a reference.

2. Apparatus for detecting movement of a grating relative to a laser light source comprising, in combination:

laser means for supplying a first laser beam;

first cube beam splitter means for splitting said first laser beam into second laser and third laser beams directed substantially orthogonal one another and defining a plane;

first modulating means for modulating said second laser beam at a first frequency;

second modulating means for modulating said third laser beam at a second frequency which second frequency is slightly offset from said first frequency;

grating means positioned to intersect said modulated second and third beams at substantially the same distance from said cube beam splitter second means and having a pitch G which is sufficient to produce a diffracted order from wavelength L of the laser source, the passage of said second laser and third laser beams through said grating means from one side to a second side producing incident fourth and fifth and diffracted sixth and seventh laser beams respectively;

second cube beam splitter means, including reflecting means, for redirecting said incident fifth and fourth laser beams to an intersection point to provide a first moving fringe pattern indicative of a reference frequency signal;

first reflecting means, positioned in said plane, for redirecting said diffracted sixth laser beam through said grating means adjacent the area of passage of said second laser beam therethrough to produce at least a diffracted eighth laser beam on the one side of said grating means;

second reflecting means, positioned in said plane, for redirecting said diffracted seventh laser beam through said grating adjacent the area of passage of said third beam therethrough to produce at least a diffracted ninth laser beam on the one side of said grating that intersects said eighth laser beam;

fringe means positioned at the intersection of said ninth and eighth laser beams to provide a second moving fringe pattern indicative of the difference in frequency of the ninth and eighth laser beams and further indicative of the position of said grating means relative a reference; and phase detector means, positioned to detect the signals represented by said first and second fringe patterns and provide an output signal indicative of the difference in phase therebetween, the phase difference being indicative of the position of said grating means relative to the reference zero order fringe pattern.

3. Encoding apparatus for measuring motion of an optical grating comprising, in combination:

means for providing a coherent source first light beam having a wavelength L where G (which is the spacing distance between adjacent grating lines) is chosen to produce at least one diffracted order from L and being oriented in a given first path;

means, situated in said first path, for producing $F_1$ second and $F_2$ third light beams from said first light beam wherein said second and third light beams are slightly different frequencies and pass through an optical grating of spacing G to produce fourth, fifth, sixth and seventh light beams, said fourth and fifth light beams being zero order and N order beams respectively derived from said second light beam at the output side of the grating, said sixth and seventh light beams being zero order and N order beams respectively derived from said third light beam at the output side of the grating, the directions of said second and third light beams being such that movement of said grating in a given direction upwardly alters the frequency of said fourth and fifth light beams and downwardly alters the frequency of said sixth and seventh light beams;

means, situated to intercept said fourth and sixth light beams, for detecting a reference phase from a moving interference pattern generated between said zero order fourth and sixth light beams to produce a first electrical signal;

means, situated to intercept said fifth and seventh light beams, for detecting a test phase from a moving interference pattern generated between said N order fifth and seventh light beams to produce second electrical signal; and means, connected to said last two named means to receive said first and second signals therefrom, for producing an output third electrical signal indicative of phase difference of said first and second signals and thus the amount of movement of the grating.

4. The method of detecting movement of a grating using laser beam based apparatus comprising the steps of:

passing a first frequency first laser beam through a grating at an angle such that there is a vectorial component of the first laser beam which is coincident to a first direction of movement of the grating for producing a zero order second laser beam and a diffracted N order third laser beam on the other side of the grating;

passing a second frequency laser fourth beam through the grating at an angle such that there is a vectorial component of the second frequency fourth laser beam which is coincident to but opposite said first direction of movement of the grating for producing a zero order fifth laser beam and a diffracted N order sixth laser beam on the other side of the grating;

detecting a reference phase from a moving interference pattern generated between said second laser and fifth laser beams and providing a first electrical signal indicative thereof;

detecting a test phase from a moving interference pattern generated between said third and sixth laser beams and providing a second electrical signal indicative thereof; and detecting the phase difference between said first and second electrical signals to provide an accumulated output indicative of the magnitude and direction of movement of the grating.

5. Apparatus for detecting movement of a grating comprising, in combination:

grating means movable in first and second opposing directions;

first laser means for directing a laser with frequency modulated by first AOM, first beam through said grating means at an angle such that there is a vectorial component of the beam which is coincident to said first direction of movement of said grating for producing a zero order third beam and a diffracted N order fourth beam on the other side of the grating;

second laser means for directing a second laser with frequency modulated by second AOM, second beam through said grating at an angle such that there is a vectorial component of the beam which is coincident said second direction of movement of said grating for producing a zero order fifth beam and a diffracted N order sixth beam on the other side of the grating;

first detection means situated to interfere said third and fifth beams for detecting the reference phase between said third and fifth beams and providing a reference output first electrical signal indicative thereof;

second detection means situated to intercept said fourth and sixth beams for detecting the test phase between said fourth and sixth beams and providing a motion output second electrical signal indicative thereof; and third detection means, connected to said first and second detection means to receive said first and second output electrical signal therefrom, for detecting the phase difference between said first and second electrical signals to provide an accumulated output indicative of the magnitude and direction of movement of said grating.

6. The method of detecting movement of a grating using laser beam based apparatus comprising the steps of:

generating a zero order first laser beam and diffracted N order second laser beam of a first frequency modulation;

passing said N order second laser beam of first frequency modulation through a grating at an angle such that there is a vectorial component of the N order beam which is coincident to a first direction of movement of the grating for producing a diffracted N order third laser beam on the other side of the grating;

detecting the phase difference between said zero order first laser beam and said N order third laser beam using interference fringe pattern generation techniques;

providing an output electrical signal indicative of the phase difference using heterodyne techniques; and accumulating the changed values of said output electrical signal for providing an apparatus output indicative of the magnitude and direction of movement of the grating.

7. Apparatus for detecting movement of a grating using laser beam based apparatus comprising, in combination:

means for generating a zero order first laser beam and a diffracted N order second laser beam of a first frequency modulation;

grating means, having a grating line spacing of G, for passing said N order second laser beam to produce a diffracted beam, said grating being at an angle such that there is a vectorial component of the second beam which is coincident to a first direction of movement of the grating for producing a diffracted N order third laser beam on the other side of the grating;

means for intercepting and for detecting the phase difference between the modulation signals of said first and third laser beams using interference fringe pattern generation techniques;

heterodyne means for providing an output first electrical signal indicative of the phase difference; and means for accumulating the changed values of said first electrical signal for providing an output indicative of the magnitude and direction of movement of said grating.

* * * * *